(12) United States Patent
Lin et al.

(10) Patent No.: US 8,890,790 B2
(45) Date of Patent: Nov. 18, 2014

(54) LIQUID CRYSTAL DISPLAY DEVICE WITH A REDUCED FABRICATION AREA

(75) Inventors: Chih-Ying Lin, Hsin-Chu (TW);
Chun-Hsin Liu, Hsin-Chu (TW);
Kuo-Chang Su, Hsin-Chu (TW);
Yung-Chih Chen, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 227 days.

(21) Appl. No.: 13/316,572

(22) Filed: Dec. 12, 2011

(65) Prior Publication Data

US 2012/0169679 A1    Jul. 5, 2012

(30) Foreign Application Priority Data

Dec. 30, 2010    (TW) ............................... 99147051 A

(51) Int. Cl.
*G09G 3/36* (2006.01)
*G02F 1/1362* (2006.01)

(52) U.S. Cl.
CPC .......... *G09G 3/3688* (2013.01); *G02F 1/13624* (2013.01)
USPC ........................................................ 345/100

(58) Field of Classification Search
CPC ............. G09G 3/29–3/3688; G09G 2300/021; G09G 2300/0842; G09G 2310/027
USPC .................................. 345/74–104; 315/169.2
See application file for complete search history.

(56) References Cited

U.S. PATENT DOCUMENTS

| | | | |
|---|---|---|---|
| 8,411,074 B2 | 4/2013 | Liu | |
| 2004/0207590 A1* | 10/2004 | Lu et al. | ........................... 345/93 |
| 2005/0036091 A1* | 2/2005 | Song | .............................. 349/129 |
| 2007/0040792 A1 | 2/2007 | Kwag | |
| 2008/0198149 A1 | 8/2008 | Yamashita | |
| 2008/0284698 A1 | 11/2008 | Lee | |
| 2010/0045639 A1 | 2/2010 | Jeon | |
| 2010/0253668 A1* | 10/2010 | Sugihara et al. | ............... 345/211 |
| 2010/0260312 A1 | 10/2010 | Tsai | |
| 2010/0328290 A1* | 12/2010 | Jeong et al. | .................... 345/211 |
| 2011/0187730 A1* | 8/2011 | Jun et al. | ........................ 345/545 |

FOREIGN PATENT DOCUMENTS

| | | |
|---|---|---|
| TW | 201035940 | 10/2010 |
| TW | 201040920 | 11/2010 |

* cited by examiner

*Primary Examiner* — Chanh Nguyen
*Assistant Examiner* — Sanghyuk Park
(74) *Attorney, Agent, or Firm* — Winston Hsu; Scott Margo

(57) ABSTRACT

A liquid crystal display device includes a plurality of pixel driving circuits and a pixel array. Each pixel driving circuit of the plurality of pixel driving circuits includes four thin film transistors and has four output terminals, where each thin film transistor is used for driving an output terminal of the four output terminals, and the four output terminals are coupled to two gate lines and two sharing lines respectively for outputting two main output signals and two sharing output signals. The phases and timings of the two main output signals and the two sharing output signals are all the same. A pixel of the pixel array is charged/discharged to a specific voltage level according to a main output signal of the two main output signals, a sharing output signal, and a signal of a data line.

6 Claims, 9 Drawing Sheets

LIQUID CRYSTAL DISPLAY DEVICE WITH A REDUCED FABRICATION AREA

BACKGROUND

1. Technical Field

The disclosure is related to a liquid crystal display device, and particularly to a liquid crystal display device that can reduce size of a thin film transistor of an output terminal of a pixel driving circuit.

2. Related Art

In liquid crystal panels, a gate driving circuit is gradually integrated into a glass substrate, where a gate driver on array (GOA) is a low-cost, space saving technique. A manufacturer can utilize an amorphous silicon thin film transistor (a-Si TFT) to realize the gate driver on array for saving cost of purchasing integrated circuit chips during a manufacturing process of the liquid crystal panel. However, electrical characteristics of the amorphous silicon thin film transistor are poor, because the amorphous silicon thin film transistor has low carrier mobility ($\mu$), an unstable threshold voltage (Vth), and an insufficient driving current.

In a new generation display device, because a high frame rate is a major trend, the gate driving circuit has to drive two gate lines. In addition, the gate driving circuit further drives another two sharing lines in order to solve a color washout problem. The gate driving circuit has to drive the two gate lines and the two sharing lines simultaneously, so a load capacitor of an output terminal of the gate driving circuit may be large, resulting in design of the gate driving circuit being difficult.

SUMMARY

An embodiment provides a liquid crystal display device. The liquid crystal display device includes a plurality of pixel driving circuits and a pixel array. Each pixel driving circuit of the plurality of pixel driving circuits has four output terminals coupled to two gate lines and two sharing lines respectively for outputting two main output signals and two sharing output signals. The pixel driving circuit includes a gate driving circuit and four thin film transistors. The gate driving circuit has an output terminal for outputting an output signal. Gates of the four thin film transistors are coupled to the output terminal of the gate driving circuit. The four thin film transistors output the two main output signals and the two sharing output signals respectively according to a clock signal and the output signal of the gate driving circuit, where phases and timings of the two main output signals and the two sharing output signals are all the same. The pixel array includes a plurality of pixels. Each pixel includes a first pixel and a second pixel. The first pixel is used for receiving a main output signal of the two main output signals and a sharing output signal. The first pixel is coupled to a data line. The second pixel is coupled to the data line and the first pixel. The second pixel is used for receiving the main output signal and compensating a voltage of the first pixel.

Another embodiment provides a liquid crystal display device. The liquid crystal display device includes a plurality of pixel driving circuits and a pixel array. Each pixel driving circuit of the plurality of pixel driving circuits has four output terminals coupled to two gate lines and two sharing lines respectively for outputting two main output signals and two sharing output signals. Each pixel driving circuit includes a first pixel driving sub-circuit and a second pixel driving sub-circuit. The first pixel driving sub-circuit includes a first gate driving circuit and two first thin film transistors. Gates of the two first thin film transistors are coupled to an output terminal of the first gate driving circuit. The second pixel driving sub-circuit includes a second gate driving circuit and two second thin film transistors. Gates of the two second thin film transistors are coupled to an output terminal of the second gate driving circuit. Phases and timings of the two main output signals and the two sharing output signals are all the same. The pixel array includes a plurality of pixels. Each pixel includes a first pixel and a second pixel. The first pixel is used for receiving a main output signal of the two main output signals and a sharing output signal. The first pixel is coupled to a data line. The second pixel is coupled to the data line and the first pixel. The second pixel is used for receiving the main output signal and compensating a voltage of the first pixel. The first gate driving circuit is the same as the second gate driving circuit.

Another embodiment provides a liquid crystal display device. The liquid crystal display device includes a plurality of pixel driving circuits and a pixel array. Each pixel driving circuit of the plurality of pixel driving circuits has four output terminals coupled to two gate lines and two sharing lines respectively for outputting two main output signals and two sharing output signals, where phases and timings of the two main output signals and the two sharing output signals are all the same. Each pixel driving circuit includes a first pixel driving sub-circuit. The first pixel driving sub-circuit includes a first gate driving circuit and a first thin film transistor. The first thin film transistor has a gate coupled to an output terminal of the first gate driving circuit. The first thin film transistor outputs a main output signal according to a clock signal and an output signal of the first gate driving circuit. The pixel array includes a plurality of pixels, where each pixel includes a first pixel and a second pixel. The first pixel is used for receiving a main output signal of the two main output signals and a sharing output signal. The first pixel is coupled to a data line. The second pixel is coupled to the data line and the first pixel. The second pixel is used for receiving the main output signal and compensating a voltage of the first pixel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
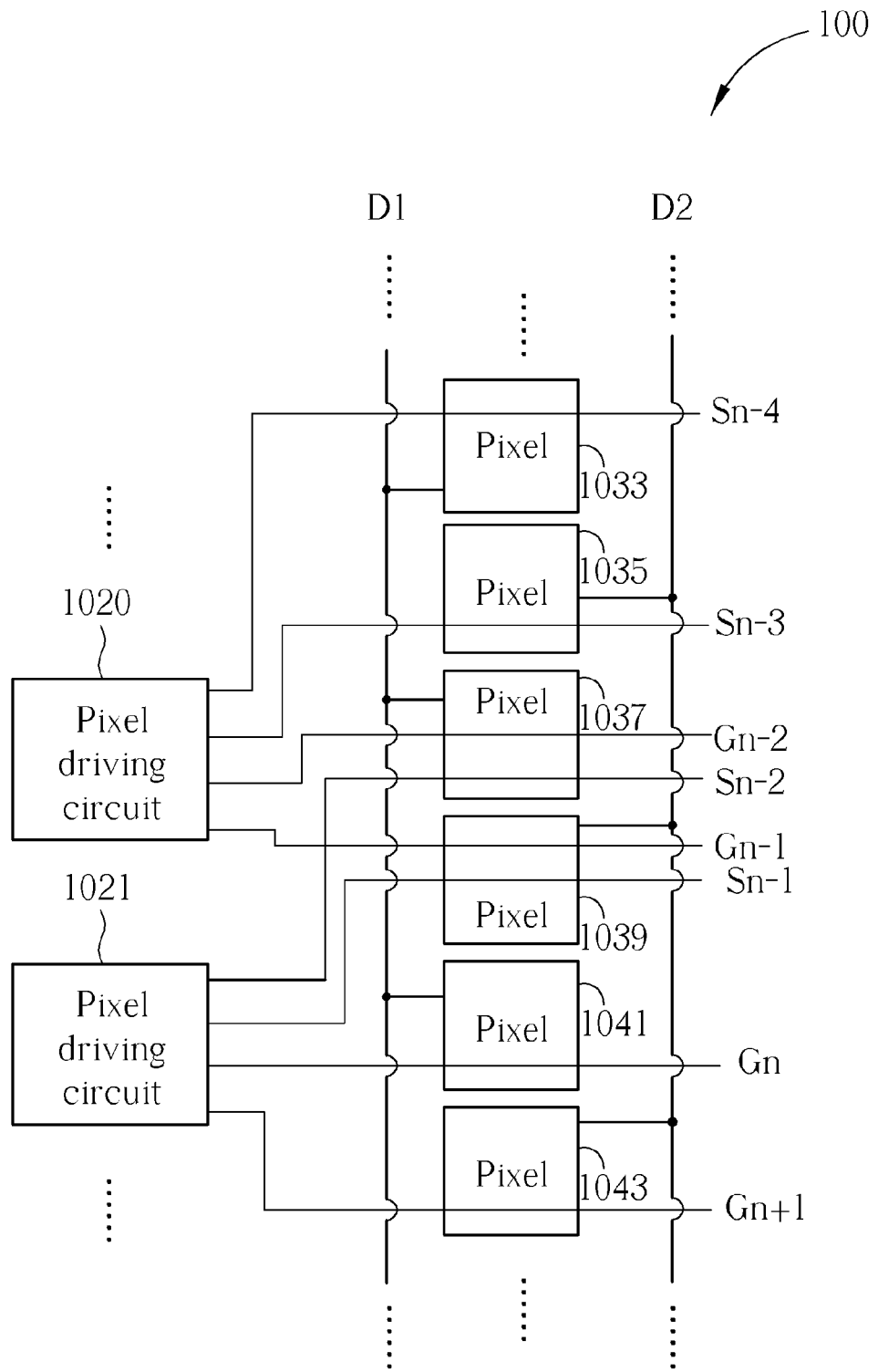
FIG. 1 is a diagram illustrating a liquid crystal display device according to an embodiment of the present invention.

Please refer to FIG. 1. FIG. 1 is a diagram illustrating a liquid crystal display device 100 according to an embodiment of the present invention. The liquid crystal display device 100 includes a plurality of pixel driving circuits and a pixel array. As shown in FIG. 1, a pixel driving circuit 1020 has four output terminals coupled to two gate lines and two sharing lines respectively for outputting two main output signals Gn−1, Gn−2 and two sharing output signals Sn−3, Sn−4. The two main output signal Gn−1, Gn−2 are used for turning on pixels 1039, 1037, and two sharing output signals Sn−3, Sn−4 are used for performing charge sharing on pixels 1035, 1033. Phases and timings of the two main output signals Gn−1, Gn−2 and the two sharing output signals Sn−3, Sn−4 are all the same. But, the present invention is not limited to the two sharing output signals Sn−3, Sn−4 performing the charge sharing on the pixels 1035, 1033. That is to say, charge sharing may be performed on the pixels 1035, 1033 by other sharing output signals. The pixel driving circuit 1021 has four output terminals coupled to two gate lines and two sharing lines, respectively, for outputting two main output signals Gn, Gn+1 and two sharing output signals Sn−1, Sn−2. The two main output signals Gn, Gn+1 are used for turning on pixels 1041, 1043, and the two sharing output signal Sn−1, Sn−2 are used for performing charge sharing on the pixels 10391037. But, the present invention is not limited to the two sharing output signals Sn−1, Sn−2 performing the charge sharing on the pixels 1039. That is to say, the charge sharing can be performed on the pixels 10391037 by other sharing output signals. Phases and timings of the two main output signals Gn, Gn+1 and the two sharing output signals Sn−1, Sn−2 are all the same. But, the present invention is not limited to two pixel driving circuits and six pixels. In addition, as shown in FIG. 1, D1 and D2 are data lines used for charging pixels according to voltages corresponding to display data for the pixels to display luminance and colors corresponding to the display data when the pixels are turned on by the gate lines and the sharing lines.

Figure 2:
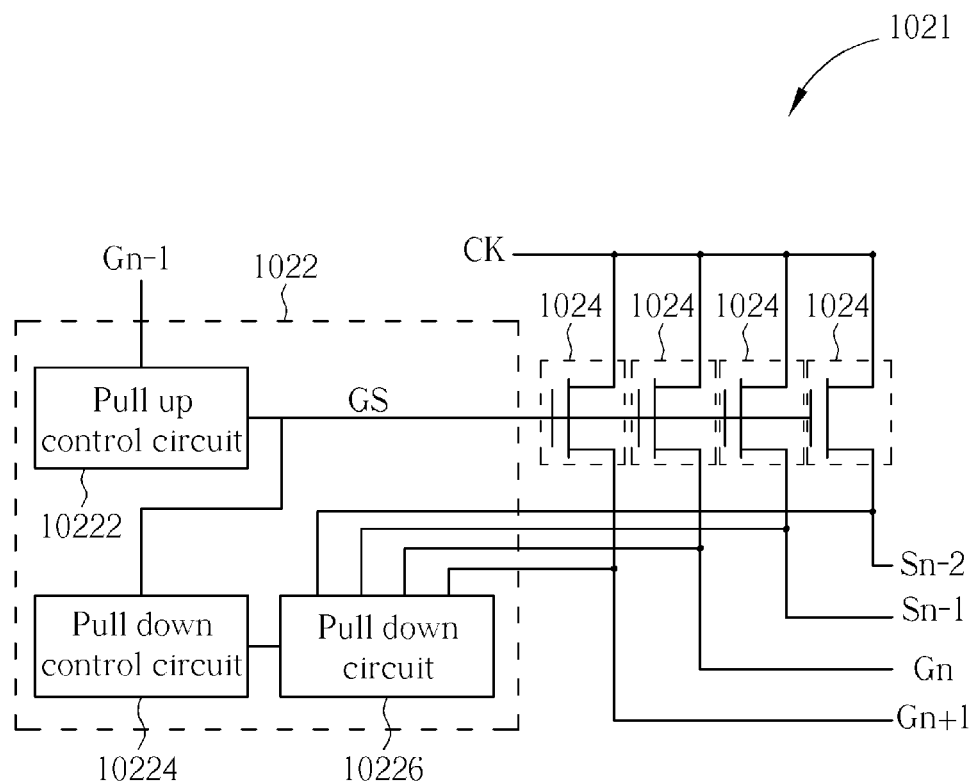
FIG. 2 is a diagram illustrating the pixel driving circuit.
Figure 3:
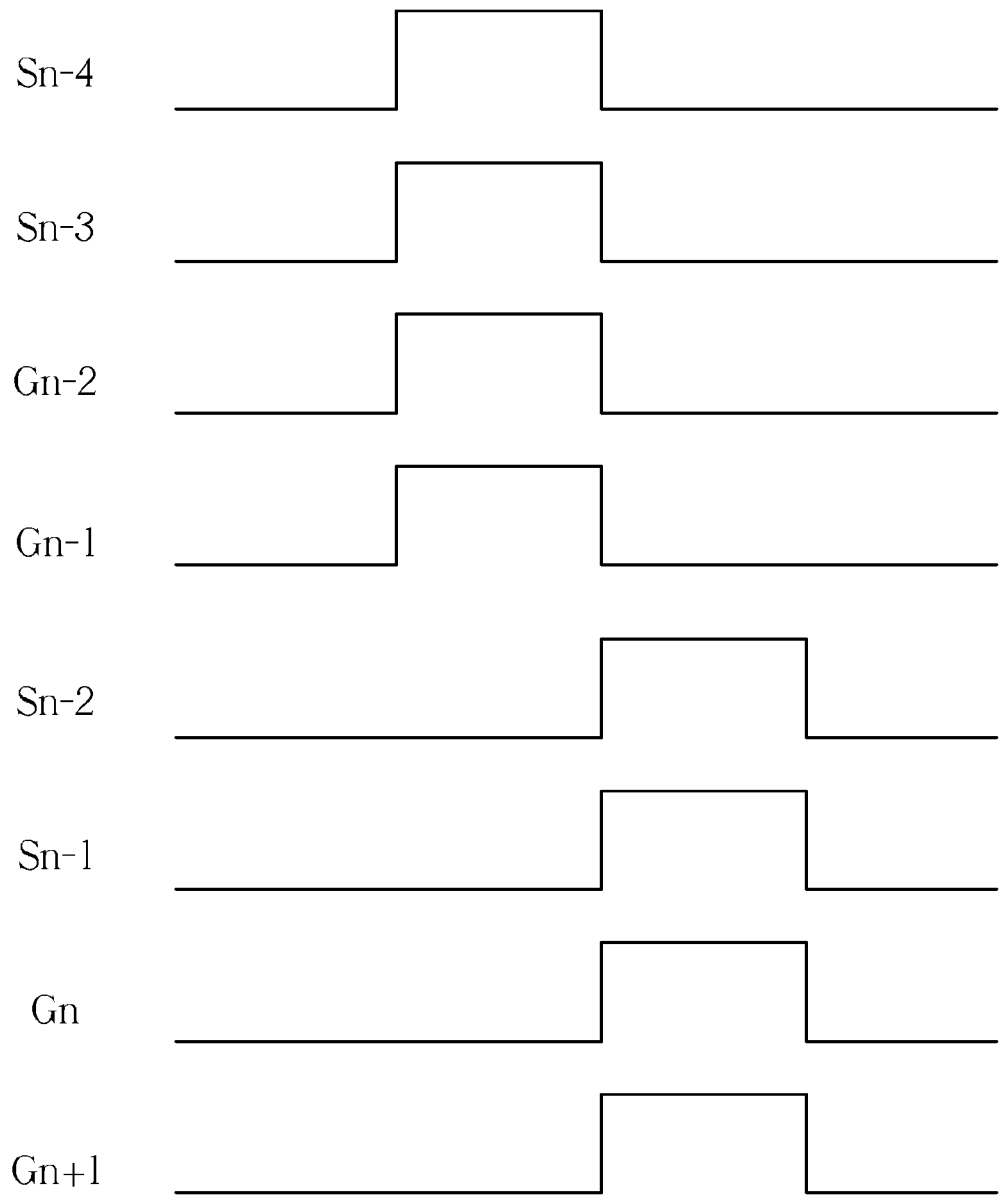
FIG. 3 is a diagram illustrating the timings of the two main output signals and the two sharing output signals of the pixel driving circuit.

Please refer to FIG. 2 and FIG. 3. FIG. 2 is a diagram illustrating the pixel driving circuit 1021, and FIG. 3 is a diagram illustrating the timings of the two main output signals Gn−1, Gn−2 and the two sharing output signals Sn−3, Sn−4 of the pixel driving circuit 1020, and the timings of the two main output signals Gn, Gn+1 and the two sharing output signals Sn−1, Sn−2 of the pixel driving circuit 1021. As shown in FIG. 2, the pixel driving circuit 1021 includes a gate driving circuit 1022 and four thin film transistors 1024. The gate driving circuit 1022 includes a pull up control circuit 10222, a pull down control circuit 10224, and a pull down circuit 10226. The pull up control circuit 10222 is used for receiving the main output signal Gn−1 of the pixel driving circuit 1020, and outputting a gate control signal GS to gates of the four thin film transistors 1024. The pull down control circuit 10224 is used for receiving the gate control signal GS. The pull down circuit 10226 is used for pulling down voltages of source terminals of the four thin film transistors 1024 to a reference low voltage to turn off the four thin film transistors 1024 according to an output signal of the pull down control circuit 10224. The gates of the four thin film transistors 1024 are coupled to an output terminal of the gate driving circuit 1022. The four thin film transistors 1024 drive the two main output signals Gn, Gn+1 and the two sharing output signals Sn−1, Sn−2 respectively according to a clock signal CK and the gate control signal GS outputted by the gate driving circuit 1022. Therefore, as shown in FIG. 3, because the four thin film transistors 1024 are coupled to the output terminal of the gate driving circuit 1022, phases and timings of the two main output signals Gn, Gn+1 and the two sharing output signals Sn−1, Sn−2 are all the same. Similarly, phases and timings of the two main output signals Gn−1, Gn−2 and two sharing output signals Sn−3, Sn−4 of the pixel driving circuit 1020 are all the same.

Figure 4:
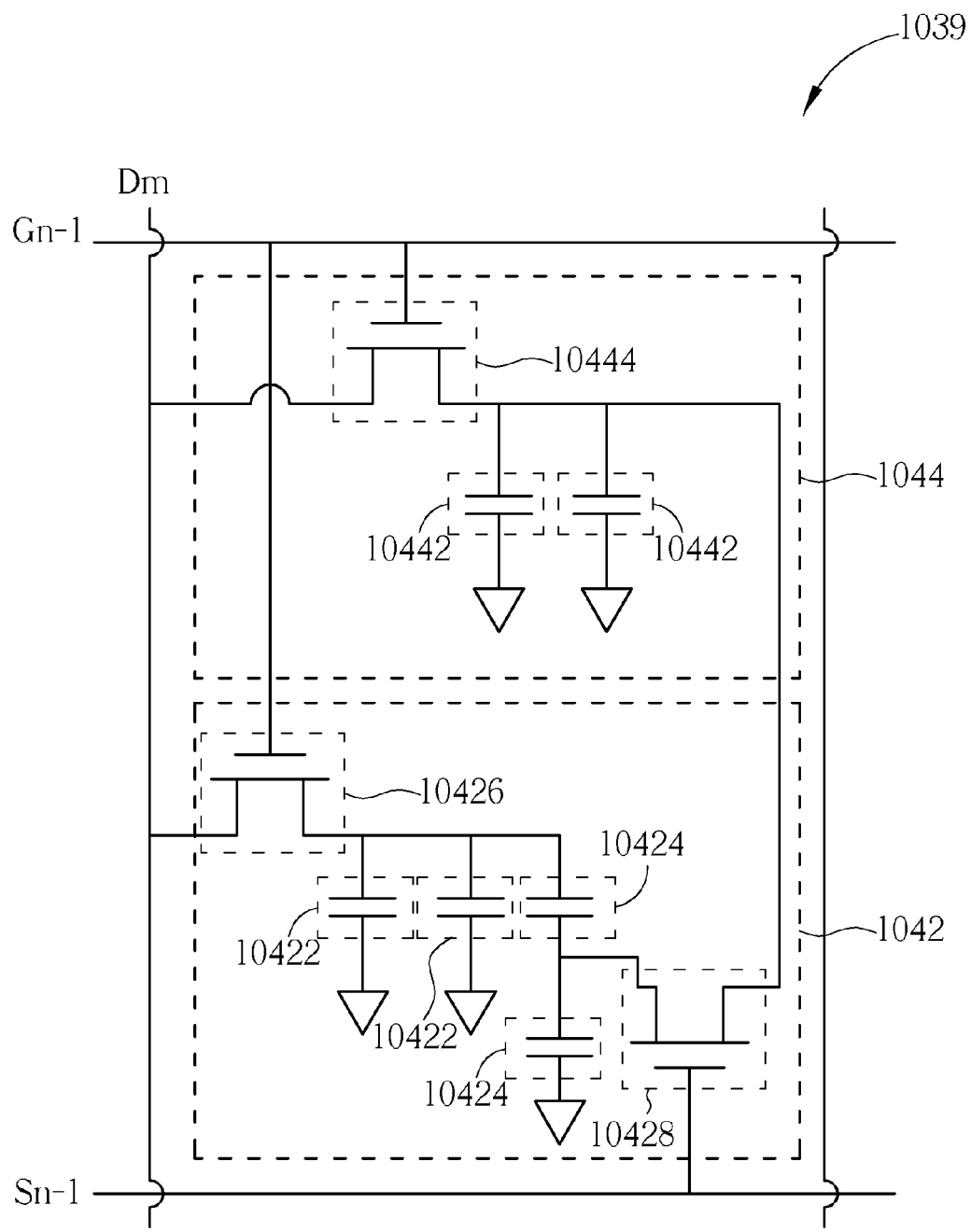
FIG. 4 is a diagram illustrating the pixel.

Please refer to FIG. 4. FIG. 4 is a diagram illustrating the pixel 1039. The pixel 1039 includes a first pixel 1042 and a second pixel 1044. The first pixel 1042 is used for receiving the main output signal Gn−1 and the sharing output signal Sn−1 of the pixel driving circuit 1021. The first pixel 1042 is coupled to the data line Dm, but the pixel 1039 is not limited to being performed the charge sharing by the sharing output signal Sn−1. The second pixel 1044 is used for receiving the main output signal Gn−1 of the pixel driving circuit 1020. The second pixel 1044 is coupled to the data line Dm and the first pixel 1042 for compensating a voltage of the first pixel 1042. The first pixel 1042 includes two second capacitors 10422, two third capacitors 10424, a second switch 10426, and a third switch 10428. The second pixel 1044 includes two first capacitors 10442, and a first switch 10444. Further, structures of the pixels 1043, 1041, 1037, 1035, 1033 are the same as structure of the pixel 1039, so further descriptions thereof are omitted for simplicity.

Figure 5:
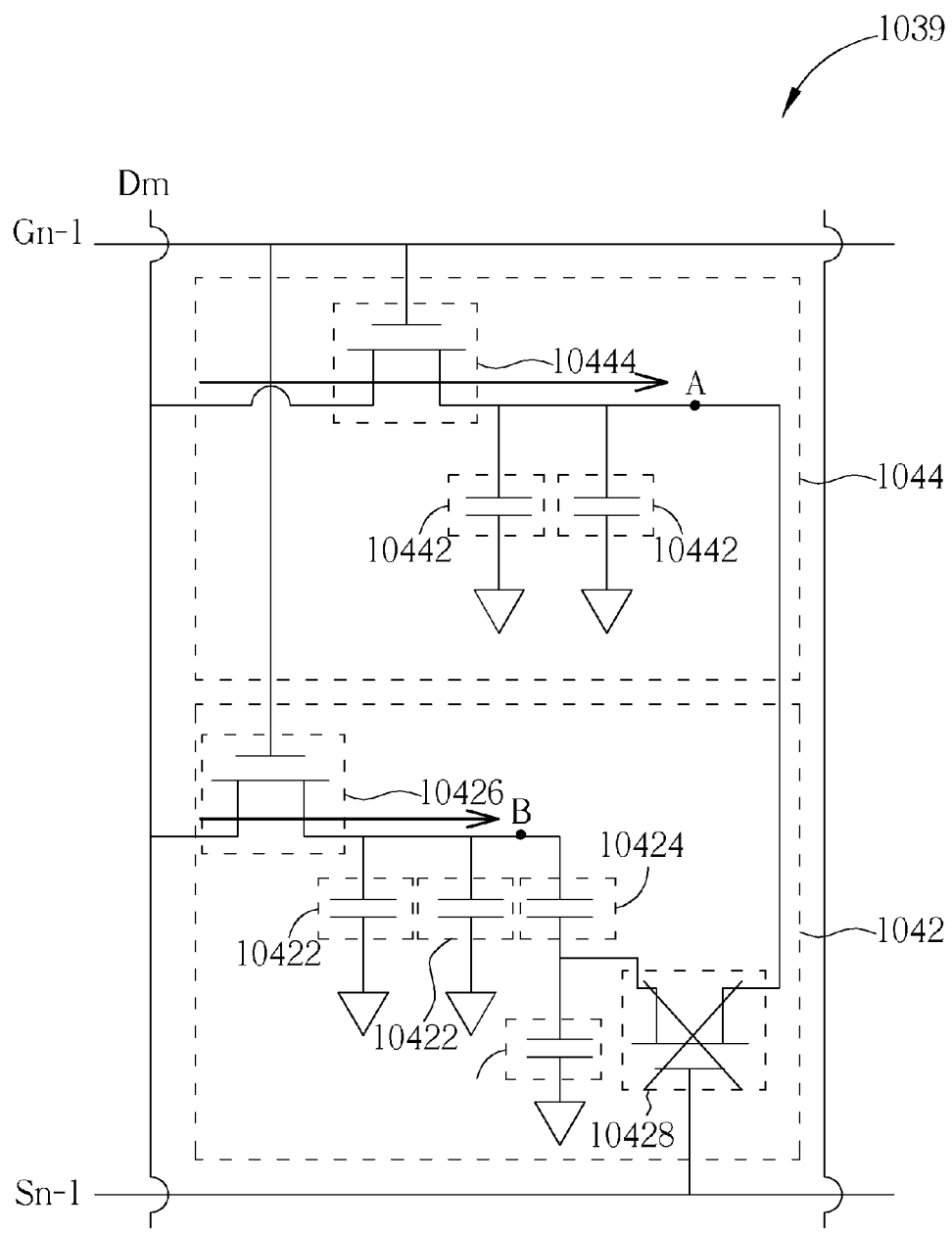
FIG. 5 and FIG. 6 are diagrams illustrating charging processes of the first pixel and the second pixel.
Figure 6:
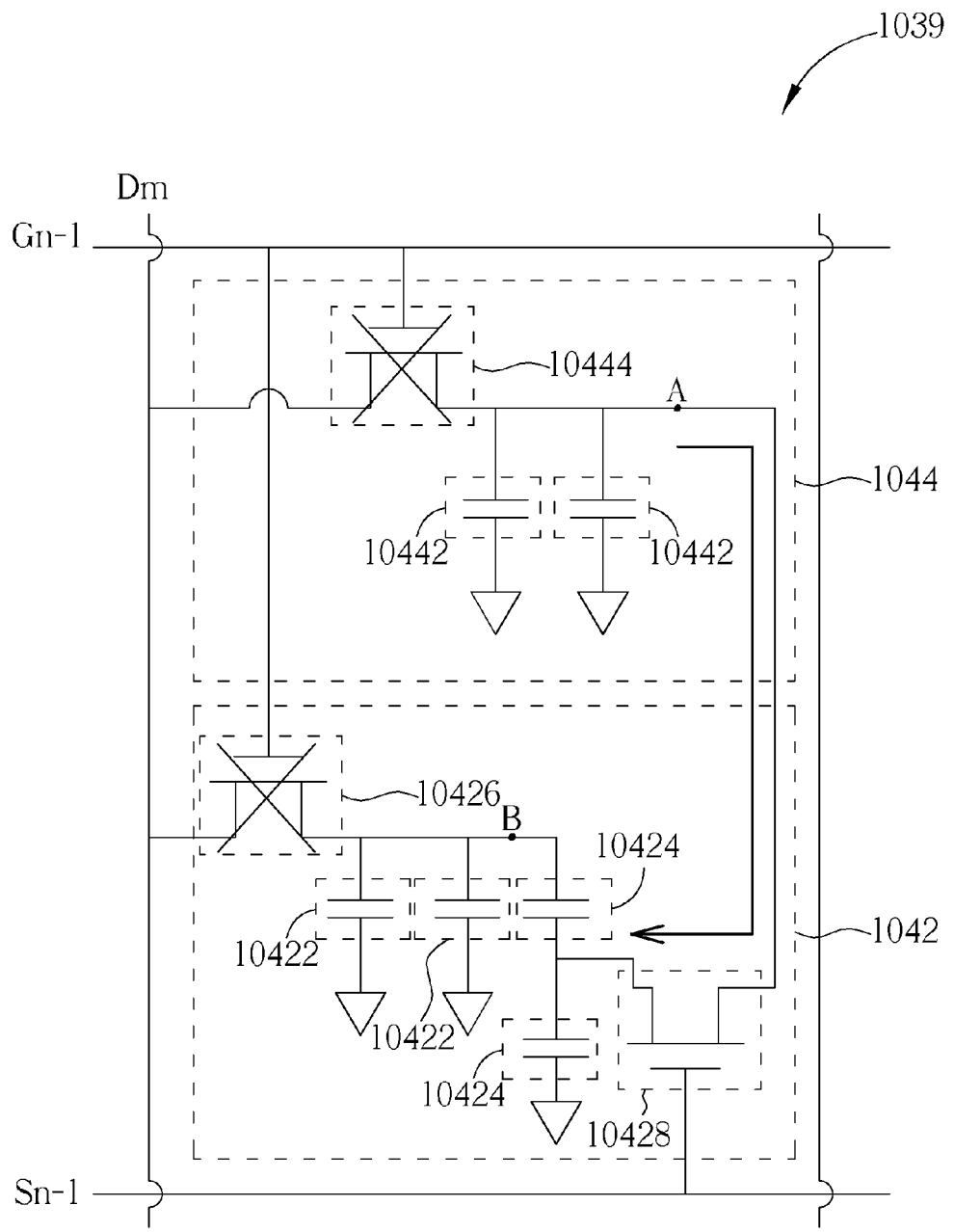

Please refer to FIG. 5 and FIG. 6. FIG. 5 and FIG. 6 are diagrams illustrating charging processes of the first pixel 1042 and the second pixel 1044. As shown in FIG. 5, when the main output signal Gn−1 is changed from a logic-low voltage to a logic-high voltage, the first switch 10444 is turned on, so that a signal of the data line Dm charges the two first capacitors 10442 to a first voltage V1 through the first switch 10444. Meanwhile, a voltage of a node A is at the first voltage V1. Similarly, the second switch 10426 is turned on, so that the signal of the data line Dm charges the two second capacitors 10422 to the first voltage V1 through the second switch 10426. Meanwhile, a voltage of a node B is also at the first voltage V1. In addition, the third switch 10428 is controlled by the sharing output signal Sn−1. Meanwhile, because the sharing output signal Sn−1 is not enabled, the third switch 10428 is not turned on yet. As shown in FIG. 6, when the sharing output signal Sn−1 is changed from the logic-low voltage to the logic-high voltage (the main output signal Gn−1 is changed from the logic-high voltage to the logic-low voltage, so the first switch 10444 and the second switch 10426 are turned off), the third switch 10428 is turned on. Meanwhile, charges stored in the two first capacitors 10442 and the two third capacitors 10424 are redistributed by the third switch 10428, so the voltage of the node A is decreased and the voltage of the node B is increased. Thus, the present invention can solve a washout problem of a liquid crystal panel by making the voltage of the node A different from the voltage of the node B.

Figure 7:
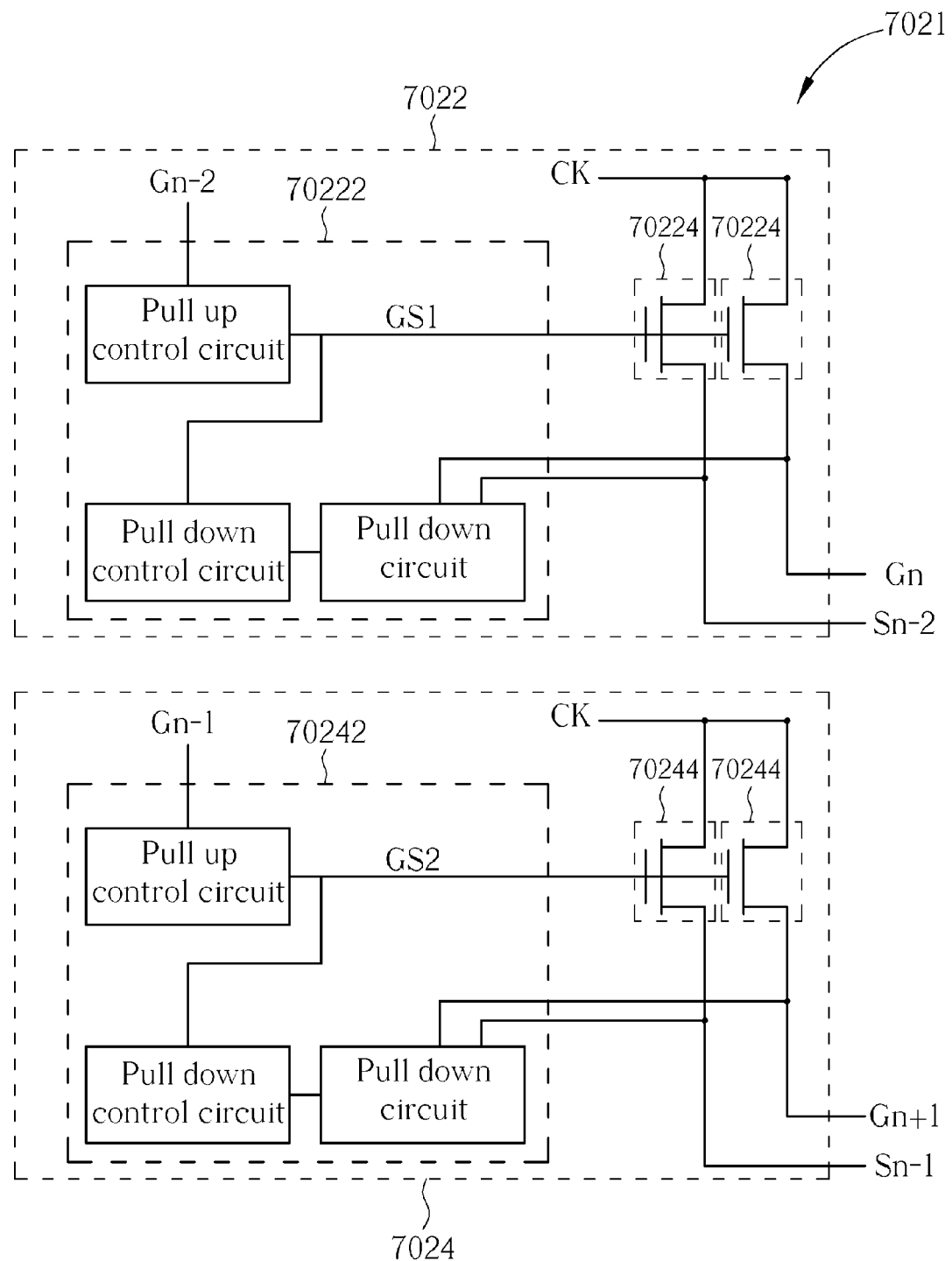
FIG. 7 is a diagram illustrating a pixel driving circuit according to a second embodiment of the present invention.

Please refer to FIG. 7. FIG. 7 is a diagram illustrating a pixel driving circuit 7021 according to a second embodiment of the present invention. The pixel driving circuit 7021 includes a first pixel driving sub-circuit 7022 and a second pixel driving sub-circuit 7024. The first pixel driving sub-circuit 7022 includes a first gate driving circuit 70222 and two first thin film transistors 70224. The first gate driving circuit 70222 is the same as the gate driving circuit 1022, so further description thereof is omitted for simplicity. Gates of the two first thin film transistors 70224 are coupled to an output terminal of the first gate driving circuit 70222. The two first thin film transistors 70224 drive the main output signal Gn and the sharing output signal Sn−1 respectively according to the clock signal CK and a gate control signal GS1 outputted by the first gate driving circuit 70222. The second pixel driving sub-circuit 7024 includes a second gate driving circuit 70242 and two second thin film transistors 70244. The second gate driving circuit 70242 is the same as the gate driving circuit 1022, so further description thereof is omitted for simplicity. Gates of the two second thin film transistors 70244 are coupled to an output terminal of the second gate driving circuit 70242. The two second thin film transistors 70244 drive the main output signal Gn+1 and the sharing output signal Sn−2 according to the clock signal CK and a gate control signal GS2 outputted by the second gate driving circuit 70242. The timings of the two main output signals Gn, Gn+1 and the two sharing output signals Sn−1, Sn−2 driven by the gates of the two first thin film transistors 70224 and the two second thin film transistors 70244 are as shown in FIG. 3. But the pixel driving circuit 7021 is not limited to the above mentioned signal output method. In another method of outputting signals in the pixel driving circuit 7021, the first pixel driving sub-circuit 7022 outputs the main output signal Gn and the sharing output signal Sn−2, and the second pixel driving sub-circuit 7024 outputs the main output signal Gn+1 and the sharing output signal Sn−1, or the first pixel driving sub-circuit 7022 outputs the main output signal Gn, Gn+1 and the second pixel driving sub-circuit 7024 outputs the sharing output signal Sn−1, Sn−2.

Figure 8:
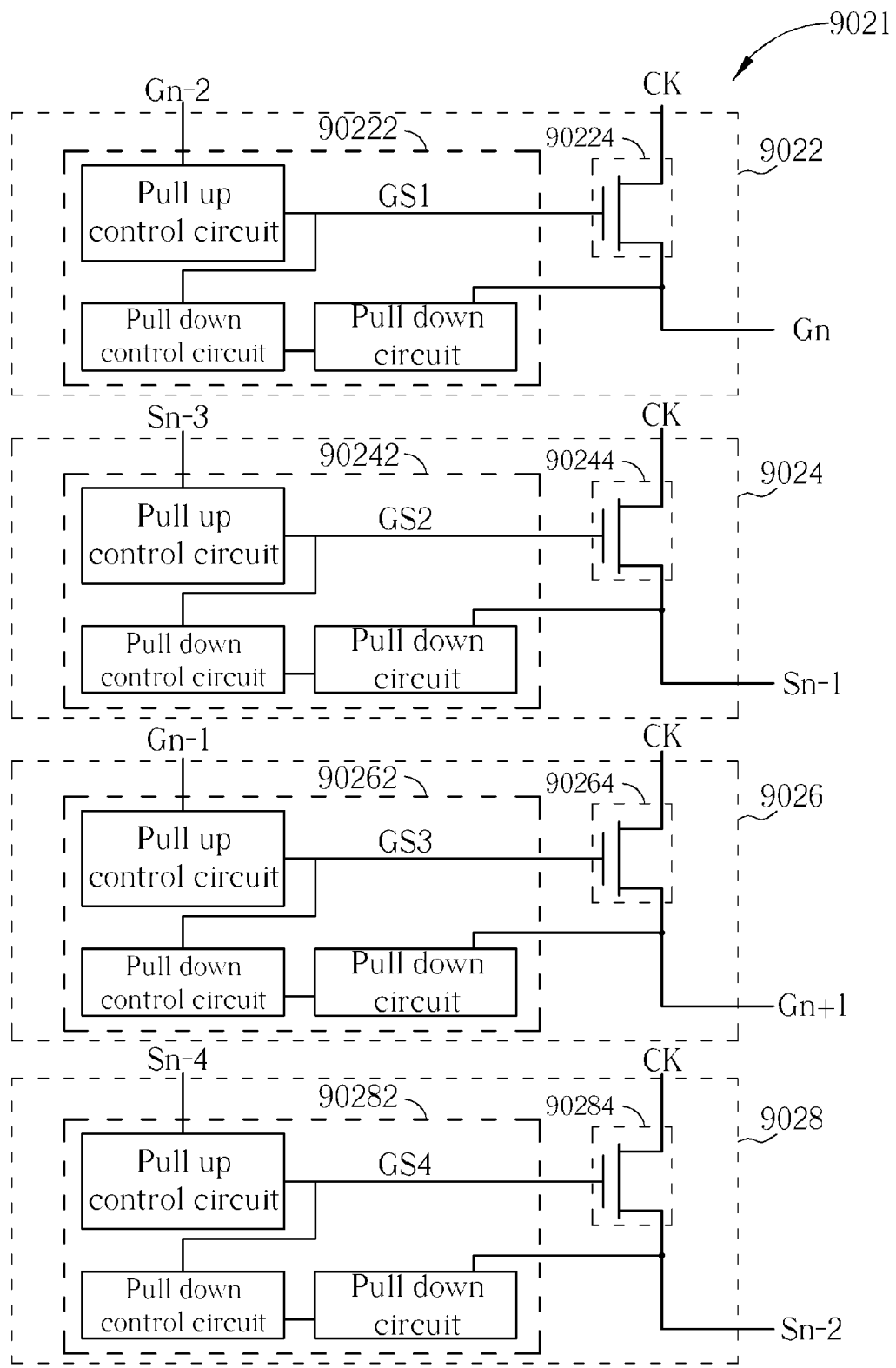
FIG. 8 is a diagram illustrating a pixel driving circuit according to a third embodiment of the present invention.

Please refer to FIG. 8. FIG. 8 is a diagram illustrating a pixel driving circuit 9021 according to a third embodiment of the present invention. The pixel driving circuit 9021 includes a first pixel driving sub-circuit 9022, a second pixel driving sub-circuit 9024, a third pixel driving sub-circuit 9026, and a fourth pixel driving sub-circuit 9028. The first pixel driving sub-circuit 9022 includes a first gate driving circuit 90222 and a first thin film transistor 90224. The first gate driving circuit 90222 is the same as the gate driving circuit 1022, so further description thereof is omitted for simplicity. The first thin film transistor 90224 has a gate coupled to an output terminal of the first gate driving circuit 90222, and the first thin film transistor 90224 drives the main output signal Gn according to the clock signal CK and a gate control signal GS1 outputted by the first gate driving circuit 90222. The second pixel driving sub-circuit 9024 includes a second gate driving circuit 90242 and a second thin film transistor 90244. The second gate driving circuit 90242 is the same as the gate driving circuit 1022, so further description thereof is omitted for simplicity. The second thin film transistor 90244 has a gate coupled to an output terminal of the second gate driving circuit 90242, and the second thin film transistor 90244 drives the sharing output signal Sn−1 according to the clock signal CK and a gate control signal GS2 outputted by the second gate driving circuit 90242. The third pixel driving sub-circuit 9026 includes a third gate driving circuit 90262 and a third thin film transistor 90264. The third gate driving circuit 90262 is the same as the gate driving circuit 1022, so further description thereof is omitted for simplicity. The third thin film transistor 90264 has a gate coupled to an output terminal of the third gate driving circuit 90262, and the third thin film transistor 90264 drives the main output signal Gn+1 according to the clock signal CK and a gate control signal GS3 of the third gate driving circuit 90262. The fourth pixel driving sub-circuit 9028 includes a fourth gate driving circuit 90282 and a fourth thin film transistor 90284. The fourth gate driving circuit 90282 is the same as the gate driving circuit 1022, so further description thereof is omitted for simplicity. The fourth thin film transistor 90284 has a gate coupled to an output terminal of the fourth gate driving circuit 90282, and the fourth thin film transistor 90284 drives the sharing output signal Sn−2 according to the clock signal CK and a gate control signal GS4 of the fourth gate driving circuit 90282. The timings of the two main output signals Gn, Gn+1 and the two sharing output signals Sn−1, Sn−2 driven by the gates of the first thin film transistor 90224, the second thin film transistor 90244, the third thin film transistor 90264, and the fourth thin film transistor 90284 are as shown in FIG. 3. But the pixel driving circuit 9021 is not limited to the above mentioned signal output method.

Figure 9:
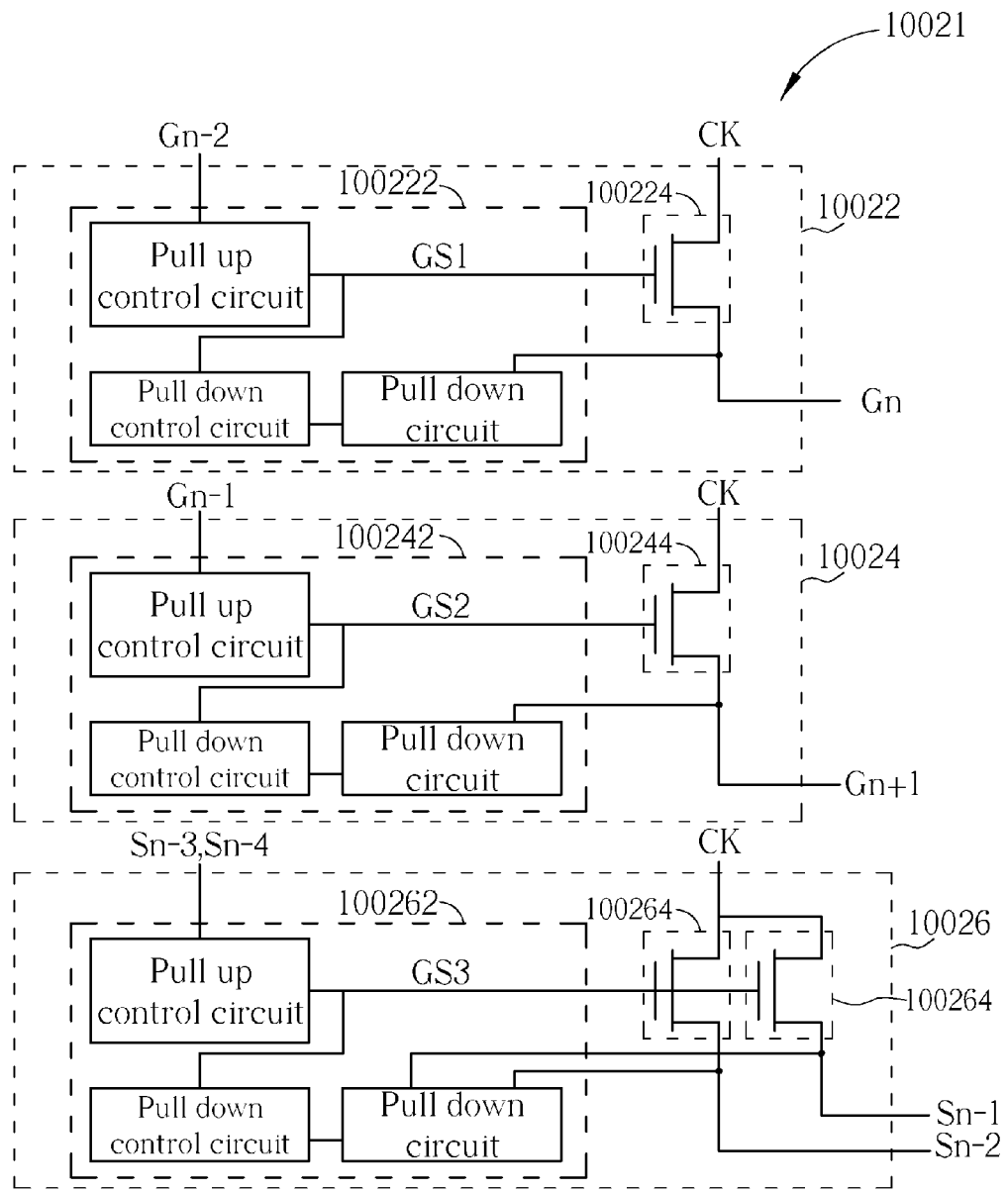
FIG. 9 is a diagram illustrating a pixel driving circuit according to a fourth embodiment of the present invention.

Please refer to FIG. 9. FIG. 9 is a diagram illustrating a pixel driving circuit 10021 according to a fourth embodiment of the present invention. The pixel driving circuit 10021 includes a first pixel driving sub-circuit 10022, a second pixel driving sub-circuit 10024, and a third pixel driving sub-circuit 10026. The first pixel driving sub-circuit 10022 includes a first gate driving circuit 100222 and a first thin film transistor 100224. The first gate driving circuit 100222 is the same as the gate driving circuit 1022, so further description thereof is omitted for simplicity. The first thin film transistor 100224 has a gate coupled to an output terminal of the first gate driving circuit 100222, and the first thin film transistor 100224 drives the main output signal Gn according to the clock signal CK and a gate control signal GS1 of the first gate driving circuit 100222. The second pixel driving sub-circuit 10024 includes a second gate driving circuit 100242 and a second thin film transistor 100244. The second gate driving circuit 100242 is the same as the gate driving circuit 1022, so further description thereof is omitted for simplicity. The second thin film transistor 100244 has a gate coupled to an output terminal of the second gate driving circuit 100242, and a second thin film transistor 100244 drives the sharing output signal Sn−1 according to the clock signal CK and a gate control signal GS2 of the second gate driving circuit 100242. The third pixel driving sub-circuit 10026 includes a third gate driving circuit 100262 and two third thin film transistors 100264. The third gate driving circuit 100262 is the same as the gate driving circuit 1022, so further description thereof is omitted for simplicity. Gates of the third thin film transistor 100264 are coupled to an output terminal of the third gate driving circuit 100262. The two third thin film transistors 100264 drive the main output signal Gn+1 and the sharing output signal Sn−2 according to the clock signal CK and a gate control signal GS3 of the third gate driving circuit 100262. The timings of the two main output signals Gn, Gn+1 and the two sharing output signals Sn−1, Sn−2 driven by the gates of the first thin film transistor 100224, the second thin film transistor 100244, and the two third thin film transistors 100264 are as shown in FIG. 3. But the pixel driving circuit 10021 is not limited to the above mentioned outputting signals method.

To sum up, the liquid crystal display device utilizes each gate driving circuit cooperating with four thin film transistors, each gate driving circuit cooperating with two thin film transistors, or each gate driving circuit cooperating with a thin film transistor to drive the two main output signals and the two sharing output signals. Each thin film transistor of the above mentioned signal output method drives one of the two main output signals and the two sharing output signals. The phases and the timings of the two main output signals and the two sharing output signals are all the same. Therefore, the present invention can solve a large load capacitor problem of the output terminal of the pixel driving circuit in the prior art. Thus, the present invention divides the thin film transistor of the output terminal into a plurality of small thin film transistors to reduce size of the thin film transistor of the output terminal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display device, comprising:
a plurality of pixel driving circuits, each pixel driving circuit having four output terminals coupled to two gate lines and two sharing lines respectively for outputting two main output signals and two sharing output signals, wherein phases and timings of the two main output signals and the two sharing output signals are all the same, the pixel driving circuit comprising:
   a first pixel driving sub-circuit comprising:
      a first gate driving circuit; and
      two first thin film transistors, gates of the two first thin film transistors coupled to an output terminal of the first gate driving circuit; and
   a second pixel driving sub-circuit comprising:
      a second gate driving circuit; and
      two second thin film transistors, gates of the two second thin film transistor coupled to an output terminal of the second gate driving circuit; and
a pixel array comprising a plurality of pixels, wherein each pixel comprises:
   a first pixel for receiving a main output signal of the two main output signals, and a sharing output signal of two sharing output signals of a next stage pixel driving circuit of the pixel driving circuit, the first pixel being coupled to a data line; and
   a second pixel for receiving the main output signal of the two main output signals, the second pixel being coupled to the data line and the first pixel for compensating a voltage of the first pixel;
wherein the plurality of pixels comprises:
   a pixel one configured to receive a first main output signal of two main output signals outputted by a first pixel driving circuit, and a first sharing output signal of two sharing output signals outputted by a second pixel driving circuit of the plurality of pixel driving circuits, wherein when the first main output signal received by the pixel one has a logic-high voltage, the first sharing output signal received by the pixel one has a logic-low voltage;
   a pixel two configured to receive a second main output signal of the two main output signals outputted by the first pixel driving circuit, and a second sharing output signal of the two sharing output signals outputted by the second pixel driving circuit of the plurality of pixel driving circuits, wherein when the second main output signal received by the pixel two has a logic-high voltage, the second sharing output signal received by the pixel two has a logic-low voltage;
   a pixel three configured to receive a first main output signal of two main output signals outputted by a third pixel driving circuit, and a first sharing output signal of two sharing output signals outputted by the first pixel driving circuit of the plurality of pixel driving circuits, wherein when the first main output signal received by the pixel three has a logic-high voltage, the first sharing output signal received by the pixel three has a logic-low voltage; and
   a pixel four configured to receive a second main output signal of the two main output signals outputted by the third pixel driving circuit, and a second sharing output signal of the two sharing output signals outputted by the first pixel driving circuit of the plurality of pixel driving circuits, wherein when the second main output signal received by the pixel four has a logic-high voltage, the second sharing output signal received by the pixel four has a logic-low voltage.

2. The liquid crystal display device of claim 1, wherein the two first thin film transistors output a main output signal of the two main output signals and a sharing output signal of the two sharing output signals respectively according to a clock signal and an output signal of the first gate driving circuit, and the two second thin film transistors output another main output signal of the two main output signals and another sharing output signal of the two sharing output signals respectively according to the clock signal and the output signal of the second gate driving circuit.

3. The liquid crystal display device of claim 1, wherein the two first thin film transistors output the two main output signals according to a clock signal and an output signal of the first gate driving circuit, and the two second thin film transistors output the two sharing output signals according to the clock signal and the output signal of the second gate driving circuit.

4. The liquid crystal display device of claim 1, wherein the second pixel comprises:
   two first capacitors; and
   a first switch having a control terminal for charging the two first capacitors to a first voltage according to the main output signal and a signal of the data line.

5. The liquid crystal display device of claim 1, wherein the first pixel comprises:
   two second capacitors;
   two third capacitors;
   a second switch having a control terminal for charging the two second capacitors to the first voltage according to the main output signal and the signal of the data line; and
   a third switch having a control terminal for redistributing charges stored in the two first capacitors and the two third capacitors by the two third capacitors according to the sharing output signal of the next stage pixel driving circuit.

6. The liquid crystal display device of claim 1, wherein the first gate driving circuit comprises:
   a pull up control circuit for receiving a main output signal of a front stage pixel driving circuit, and outputting a gate control signal to the gates of the two first thin film transistors;
   a pull down control circuit for receiving the gate control signal; and
   a pull down circuit for turning off the two first film transistors according to an output signal of the pull down control circuit.

* * * * *